UNITED STATES PATENT OFFICE.

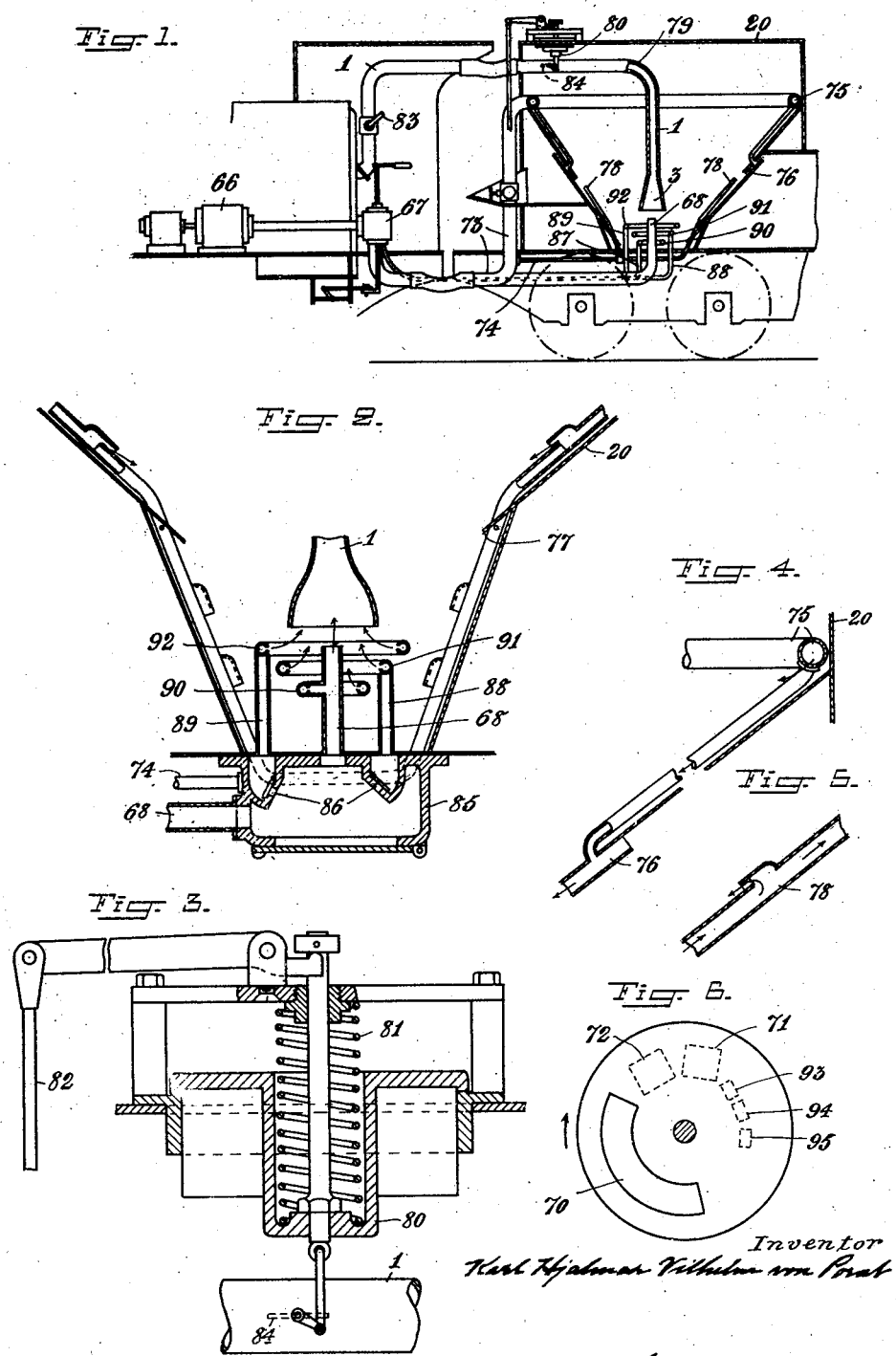

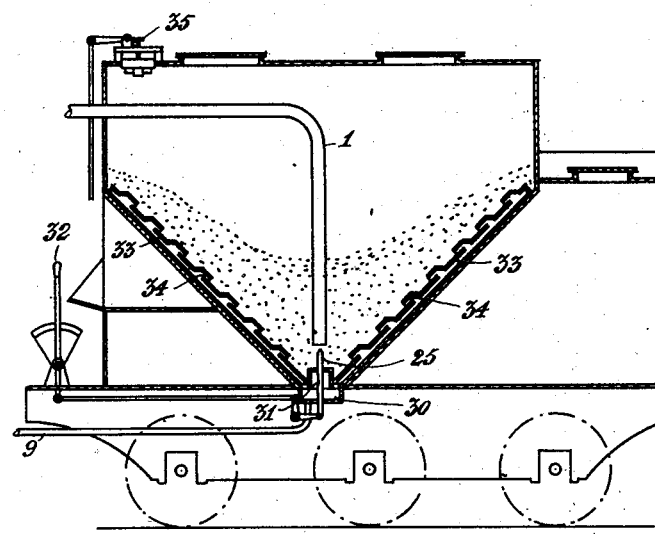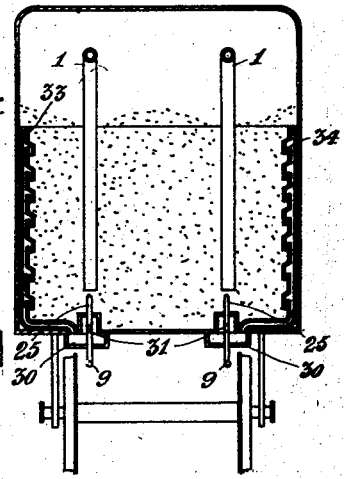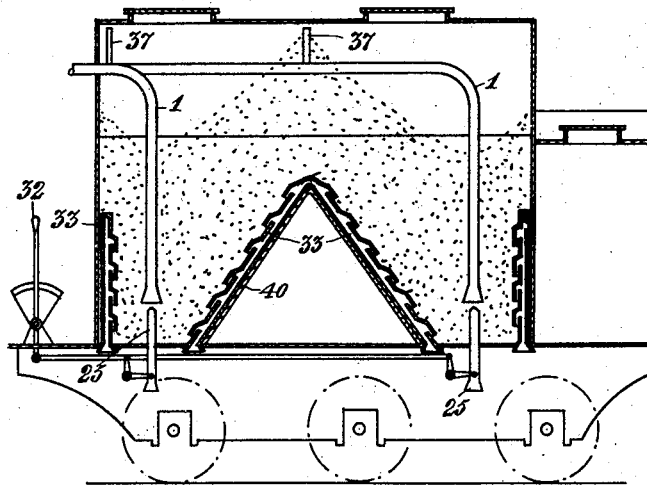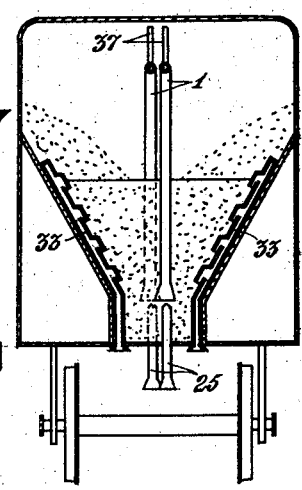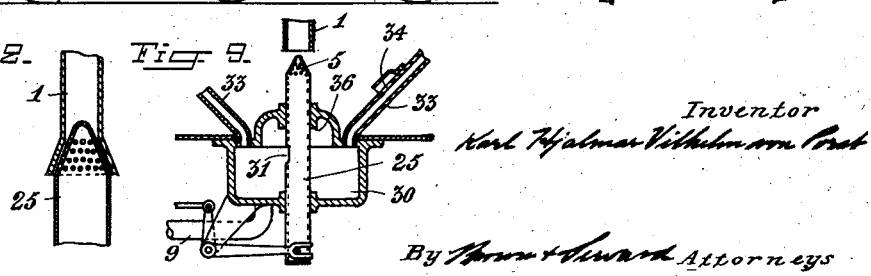

KARL HJALMAR VILHELM von PORAT, OF STOCKHOLM, SWEDEN, ASSIGNOR TO MOTALA VERKSTADS NYA AKTIEBOLAG, OF MOTALA VERKSTAD, SWEDEN.

APPARATUS FOR STIRRING AND FEEDING OF PULVERULENT FUEL IN FURNACES FOR LOCOMOTIVES OR THE LIKE.

1,390,974. Specification of Letters Patent. Patented Sept. 13, 1921.

Original application filed October 12, 1916, Serial No. 125,223. Divided and this application filed January 21, 1918. Serial No. 213,110.

*To all whom it may concern:*

Be it known that I, KARL HJALMAR VILHELM VON PORAT, a subject of the King of Sweden, residing at Västra Trädgårdsgatan 4, Stockholm, Sweden, have invented certain new and useful Improvements in Apparatus for Stirring and Feeding of Pulverulent Fuel in Furnaces for Locomotives or the like, (for which applications have been filed in Sweden, July 24, 1915, 1480/15; Norway, July 4, 1916, 9342; Denmark, July 5, 1916, 934/16; Germany, Nov. 11, 1915, P34373; Holland, Nov. 22, 1915, 6389; Russia, Apr. 25/9, 1916, 68704; Canada, Dec. 21, 1915, 199427;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to such apparatus for feeding of pulverulent fuel in furnaces for locomotives or the like, in which the fuel by means of a gaseous medium is conveyed from a fuel receptacle to the furnace, the fuel being conveyed either only by the suction, created from the draft in the furnace, or by additional suction or pressure created by an injector blower or the like.

The invention is substantially characterized by the fact that in addition to the means, which serve to supply the fuel from the receptacle to the furnace, special means are provided, which serve to stir the fuel in the receptacle so as to feed it to the fuel outlet of the receptacle.

Said stirring means essentially consists of channels for a gaseous medium under pressure arranged so as to deliver pressure air at several points of the interior of the receptacle.

The receptacle is preferably provided with a valve, adapted to be opened by hand or automatically in order to allow the air, accumulated above the fuel in the receptacle to escape to the atmosphere.

On using over pressure in the receptacle the pulverulent fuel has a tendency to adhere to the walls of the receptacle. This is however avoided by the stirring means disclosed in the present application.

Three embodiments of the invention are shown in the accompanying drawings.

Figure 1 represents a longitudinal section through a tender provided with apparatus embodying the invention.

Fig. 2 represents an enlarged detail transverse section of the apparatus.

Figs. 3, 4 and 5, represent enlarged detail sections of other parts of the apparatus.

Fig. 6 represents a plan view of the starting valve.

Fig. 7 represents a longitudinal section of a modified form.

Fig. 8 represents a transverse section of the same.

Fig. 9 represents an enlarged detail section of the same.

Fig. 10 represents a longitudinal section of a second modified form.

Fig. 11 represents a transverse section.

Fig. 12 represents an enlarged detail section of the same.

This application is a division of my application, Serial No. 125,223, filed October 12, 1916, patented April 30, 1920, No. 1,337,738.

Referring to Figs. 1–6 the magazine or receptacle 2 for the pulverulent fuel is at its bottom funnel-shaped and the lower end of this funnel is situated at or about the center of the tender. 1 is the feed pipe leading from the receptacle 2. The lower end of this pipe is conically enlarged as at 3. The feeding of the pulverulent fuel through the pipe 1 is effected by means of the blower 66, which supplies pressure air through the start valve 67 and through the four pipes 68, 87, 88 and 89 to the powder feeding member, situated near the bottom of the receptacle, where the air will whirl up the fuel and force the same through the pipe 1 to the furnace. The said feeding member consists of ring-shaped pipes 90, 91 and 92, communicating with the pipes 87, 88 and 89 respectively, which are provided with side-holes, directed inwardly, by which the air escapes, thereby whirling up the pulverulent fuel. By the pipe 68 air is directly led into the pipe 1, thereby carrying with it the pulverulent fuel.

The slide of the starting valve 67 is provided with a segmental groove 70, and the valve seat is provided with holes 71, 93, 94 and 95, leading to the pipes 68, 87, 88 and 89 respectively.

In the valve seat there is a hole 72, communicating by means of the pipe 73 with a stirring up device in the receptacle. When air is admitted to the hole 72 and by turning the slide in the direction of the arrow as shown in Fig. 6, the hole 72 is first brought into communication with the slide groove 70 leading to the stirring up device; the groove 70 will upon the further turning of the slide register with the hole 71 communicating with the pipe 68, which blows through and cleans the pipe 1, and finally the groove will register with the openings 93, 94 and 95 communicating with the pipes 87, 88 and 89 and the respective feeding members 90, 91 and 92. The feeding of the pulverulent fuel is regulated by the manual operation of the valve 67 through the handle as shown, but of course it is also possible to regulate the quantity of fuel by regulating the speed of the air current.

The stirring up of the fuel in the receptacle so as to secure its proper movement to the fuel outlet is effected by means of air under pressure, which is introduced by the pipe 73 into the air channels 75, 76 and 77 (see Figs. 2 and 4) and by the pipe 74 into the air channels 78 (Fig. 5); said air channels being arranged around the magazine. The air channels consist either of the pipes 75 and 78, which are provided with air holes on the sides and are slit along their whole length or they are formed as is shown at 76 and 77 by the plates projecting at a small distance from the walls and bottom of the receptacle.

It will be understood that the valve 67 can be rotated to positions in which the communication between 70 and 72 is interrupted, while communication between 70 and all or one or two of the openings 93, 94, 95 is maintained. If when starting the valve is rotated in a direction opposite the arrow Fig. 6 the feeding pipes 87, 88, 89 can be supplied with air without first supplying air to the stirring channels. The feeding thus can be started, regulated and stopped independent of the stirring.

The receptacle for the pulverulent fuel is airtightly closed so that the pressure therein will be somewhat lower than that in the air pipes. When the air inlet is shut off by means of the valve 67, the air in the magazine will escape by passing through the hole 79 and the pipe 1 to the furnace, until the pressure in the receptacle will cease. When the valve 67 is adjusted so as to admit air to 72 the air will flow through the pipes 73, 74 and 78, 75, 76 and 77 to the magazine and will force the fuel downwardly and will also penetrate the fuel body. By rotating the valve in the direction of arrow a stirring up of the fuel is effected every time and immediately before the feeding operation is started.

80 (Fig. 3 on a larger scale) is a valve, arranged on the receptacle and closed by means of spring 81. Said valve can be operated by hand by means of the lever 82. In case an intense stirring up in the receptacle is to be effected, a cock 83 in the pipe 1 is closed and the valve 80 is opened. By arranging a damper 84 in the pipe 1 and connecting it with the valve 80 the pipe 1 will be shut off by means of the lever 82 at the same time as the valve 80 will be opened, and in this arrangement the cock will be unnecessary.

When the air is admitted to the stirring channels 75, 76 and 77 it flows through the powder mass and fills the space above the mass, in which space thus successively an air-pressure will arise, which finally prevents the air from entering into and stirring the mass. By opening the valve 80 air from said space is allowed to escape, so that the pressure therein is lowering about to the pressure of atmosphere, whereby the pressure air from the stirring channels 75, 76, 77 if the stirring operation is started, will penetrate the pulverulent mass and stir it.

When the feeding (supply of air to 68, 87, 88, 89) is interrupted and the stirring (supply of air to 74) is started, by means of valve 67, the air in the magazine will escape through the hole 79 and the pipe 1, so that the air from the stirring channels penetrates the mass and stirs it. Thus an exhaust of the air in the space above the mass is effected automatically when starting the stirring by means of valve 67 without starting the feeding. If an effective exhaust of said space and an effective stirring is desired it is however necessary to open the valve 80.

In the embodiment according to Fig. 2 the pipes 90, 91 and 92 are not connected directly with the start valve 67 but with a casing 85, arranged under the magazine. This casing communicates by means of a single pipe 68 with the start valve and from said casing the fuel pipes branch. The said pipes are provided with valves 86, opened by the pressure in the casing and being differently loaded. Air being introduced in the casing 85 by the pipe 68, it will at first flow through the central pipe of the feeding device, whereby a part of the pulverulent fuel is whirled up and brought with to the furnace through the pipe 1. If the pressure is raised, one of the valves 86 which is to be exposed to the lowest load, is opened so that air is introduced in the pipes 88 and 99. In case the pressure grows further, the other valve 86, which is to be exposed to a greater load, will also open and air flows through the pipes 89 and 92 also, so that the full feeding of the fuel is effected.

According to the embodiments shown in 7–12 two fuel pipes 1 are provided and opposite the fuel inlet mouth of each of these pipes there is arranged a feeding device.

According to Figs. 7, 8 and 9 compressed air is used for the feeding operation, said air being conveyed through the conduit 9 to the box 30 and therefrom to the pipe 25 through the hole 31. The pipe 25, that is movable vertically, forms the regulating organ for the feed. Its upper, conical end is provided with holes 5, through which air streams into the reservoir and whirls up to the powder below the inlet opening of pipe and further feeds it through the pipe or conduit 1 to the furnace. The pipe 25 may be moved to or from the mouth of the pipe 1 by means of the hand lever 32. If the pipe 25 is lowered deeper into the powder mass, more powder will be whirled up and blown off to the furnace, while if the pipe is raised the condition will be the reverse.

The stirring device consists of pipes 33, which project from the box 30 and are provided with holes 34, which may be overlapped by casings, preventing the powder from entering through the holes 34 into the pipes 33.

Through the pipe 33 and the holes 34 air is pressed through the powder mass, whereby the formation of "bridges" in the powder is avoided and the powder more easily flows down to the pipe 25. The reservoir is air-tight and provided with a valve 35, having the same purpose as the valve 80, Fig. 1.

When the feeding operation is to be interrupted the pipe 25 is raised so high, that the hole 31 is closed by the casing 36, so that no air can enter the pipe 25.

The air is then pressed in only through the pipes 33, and if the pressure in the reservoir on the powder is diminished or entirely taken away by opening the valve 35, a powerful stirring of the powder will occur.

In the embodiment according to Figs. 10, 11 and 12 the air current is effected by suction.

The regulation of the feed and the construction of the parts is somewhat different from that described above with reference to Figs. 7–9, the differences, depending upon the fact that the air current is effected by suction. When the feeding is interrupted the air entrance is closed by the conic end of the pipe 25 being pressed up in the conic end of the exhaust pipe 1 as is shown in Fig. 12. The reservoir is also in this case air-tight, but in same prevails vacuum, effected by the air in the reservoir being sucked out through the pipes 37 and 1.

On account of this vacuum, air from the atmosphere will stream into the pipes 33, the lower ends of which opening outside of the receptacle, and this air flows further through the holes 34 into the powder mass and prevents the formation of "bridges" in the mass. When the air entrance through the member 25 is shut off, as is shown in Fig. 12, a more complete vacuum will prevail in the reservoir and accordingly a stronger air current flow through the pipes 33, whereby a violent stirring of the powder is effected.

According to Figs. 7 and 8 the lower part of the fore and rear walls of the reservoir have such an inclined position that the reservoir, looking from the side, is tapered downward, while the side walls of the receptacle are vertical. According to Figs. 10 and 11 the side walls are inclined, and the end walls vertical and from the bottom of the receptacle projects a ridge 40, so that, looking from the side, two downward tapered compartments are formed in the reservoir, one for each powder pipe, as is shown in Fig. 10.

Having thus fully described my invention, what I claim as new and desire to secure by Letters Patent is:—

1. In apparatus for storing up and feeding pulverulent fuel for furnaces, a receptacle for the fuel mass, a fuel outlet pipe, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, a second device for supplying a gaseous medium, such as air, into the mass in the receptacle, said second device opening into the interior of the receptacle at points lying at a relatively great distance from said pipe and higher than the plane in which the said fuel receiving opening is located.

2. In apparatus for storing up and feeding pulverulent fuel for furnaces, a receptacle for the fuel mass, a fuel outlet pipe, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, said receptacle having a plurality of openings lying at different levels, and a second device for supplying a gaseous medium, such as air, into the mass in the receptacle, said second device consisting of channels extending from the lower to the upper part of the receptacle along and near the inside of the receptacle wall and communicating with the interior of the receptacle through said last named openings.

3. In apparatus for storing up and feeding pulverulent fuel for furnaces, a receptacle for the fuel mass, a fuel outlet pipe, a device for supplying a gaseous medium, such as air, into the mass in said receptacle, the discharge part of said device and the receiving openings of the fuel outlet pipe being both arranged in the lower part of the receptacle some distance above its bottom, means for preventing the fuel from falling by gravity into said opening, a second device for supplying a gaseous medium, such as air, into the mass in the receptacle, said second device opening into the interior of the receptacle at points lying at a relatively great distance from said pipe and higher than the plane in which the said fuel receiving opening is located, the lower part of the receptacle being contracted downwardly.

4. In apparatus for storing up and feeding pulverulent fuel for furnaces, a receptacle for the fuel mass, a fuel outlet pipe, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, the walls of the receptacle being air tight and provided at the upper part of the receptacle with a valve which is normally closed and is adapted to be opened manually to eliminate over pressure in the space above the mass in the receptacle.

5. In apparatus for storing up and feeding pulverulent fuel for furnaces, a receptacle for the fuel mass, a fuel outlet pipe, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, the walls of the receptacle being air tight, the fuel pipe extending upward into the receptacle from its fuel receiving opening and being provided with a small opening in its upper part within the receptacle.

6. In apparatus for storing up and feeding pulverulent fuel for furnaces, a receptacle for the fuel mass, a fuel outlet pipe, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, the walls of the receptacle being air tight, and provided at the upper part of the receptacle with a valve which is normally closed and is adapted to be opened manually to eliminate over pressure in the space above the mass in the receptacle, and a damper located in the fuel pipe and connected with said valve.

7. In apparatus for storing up and feeding pulverulent fuel for furnaces, a receptacle for the fuel mass, a fuel outlet pipe having a downwardly turned receiving opening, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, said device having an outlet faced upwardly right below the said receiving opening, a lateral outlet, and means for supplying the air to said outlets as desired.

8. In apparatus for storing up and feeding pulverulent fuel for furnaces, a receptacle for the fuel mass, a fuel outlet pipe having a downwardly turned receiving opening, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, said device comprising a conduit having a pair of tubes emanating therefrom, one of said tubes having an outlet faced upwardly right below the said receiving opening, the other tube having a lateral outlet, and an adjustable valve adapted to establish communication between the conduit and said tubes.

9. In apparatus for storing up and feeding pulverulent fuel for furnaces, a receptacle for the fuel mass, a fuel outlet pipe, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, said device consisting of a conduit, a plurality of tubes emanating therefrom and an adjustable valve on the conduit, said valve having separate passages for each of said tubes, which can be closed or opened independently of each other by the manipulation of said valve.

10. In apparatus for storing up and feeding pulverulent fuel for furnaces, a receptacle for the fuel mass, a fuel outlet pipe, a device for supplying a gaseous medium, such as air, into the mass in said receptacle, the discharge part of said device and the receiving opening of the fuel outlet pipe being both arranged in the lower part of the receptacle some distance above its bottom, means for preventing the fuel from falling by gravity into said opening, a second device for supplying a gaseous medium, such as air, into the mass in the receptacle, said second device opening into the interior of the receptacle at points lying at a relatively great distance from said pipe and higher than the plane in which the said fuel receiving opening is located, the walls of the receptacles being air tight and provided at the upper part of the receptacle with a valve which is normally closed and is adapted to be opened manually to eliminate over pressure in the space above the mass in the receptacle.

11. In apparatus for storing up and feeding pulverulent fuel for furnaces, a receptacle for the fuel mass, a blower, a conduit for said blower, a valve in said blower conduit, pipes arranged within the receptacle near the outlet, another pipe leading from said valve to said last named pipes, channels arranged around the receptacle along its sides, a further pipe leading from said valve to said channels, a fuel outlet from the receptacle, said fuel outlet being located adjacent the middle of the receptacle, the walls of the receptacle converging downwardly toward the outlet, and a fuel pipe leading from the outlet into which the fuel may be fed by means of a gaseous medium from said blower.

In testimony that I claim the foregoing as my invention, I have signed my name in presence of two subscribing witnesses.

KARL HJALMAR VILHELM von PORAT.

Witnesses:
JACOB BAGGS,
FRANK LYON.